(12) United States Patent
Appelkvist et al.

(10) Patent No.: US 6,239,759 B1
(45) Date of Patent: May 29, 2001

(54) ANTENNA CONNECTOR

(75) Inventors: Kjell-Otto Appelkvist, Dalby; Lars Lundqvist, Lund; Richard Lindahl, Malmö, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/225,123

(22) Filed: Jan. 4, 1999

(30) Foreign Application Priority Data

Jan. 5, 1998 (SE) ................................. 9800002

(51) Int. Cl.[7] ..................................... H01Q 1/12
(52) U.S. Cl. ................ 343/718; 343/867; 343/906; 340/825.44; 455/344
(58) Field of Search ..................... 343/702, 718, 343/906, 866, 867, 868; 340/825.44; 455/344, 347, 351

(56) References Cited

U.S. PATENT DOCUMENTS

| | | |
|---|---|---|
| 4,586,827 | 5/1986 | Hirsch et al. .................. 368/282 |
| 4,754,285 | 6/1988 | Robitaille . |
| 5,144,325 | * 9/1992 | Kurcbart ..................... 343/718 |
| 5,179,733 | 1/1993 | Matsui . |
| 5,235,560 | 8/1993 | Seager . |
| 5,303,421 | 4/1994 | Goldenberg . |
| 5,892,455 | * 4/1999 | Matsumoto ............ 340/825.44 |
| 5,986,566 | * 11/1999 | Yamamori ............. 340/825.44 |

FOREIGN PATENT DOCUMENTS

| | | |
|---|---|---|
| 0126629 | 11/1984 | (EP) . |
| 0631341 | 12/1994 | (EP) . |

* cited by examiner

*Primary Examiner*—Tho G Phan
(74) *Attorney, Agent, or Firm*—Burns, Doane, Swecker & Mathis, L.L.P.

(57) ABSTRACT

An antenna connector has a wrist-band contact part for attachment to a wrist-band and connection to an antenna therein and for rotatable arrangement on a wrist-watch pin, and a wrist-watch contact part for rotatable arrangement on the wrist-watch pin in electric contact with the wrist-band contact part and for connection to electronic means within a wrist-watch.

8 Claims, 2 Drawing Sheets

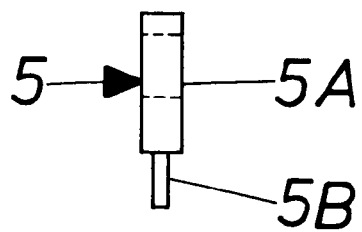
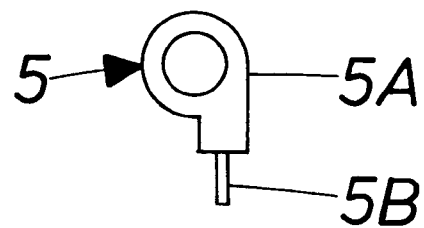
Fig.6A                Fig.6B
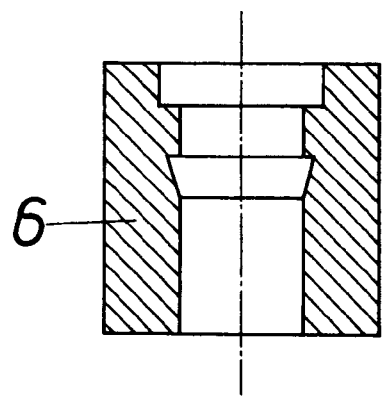
Fig.7
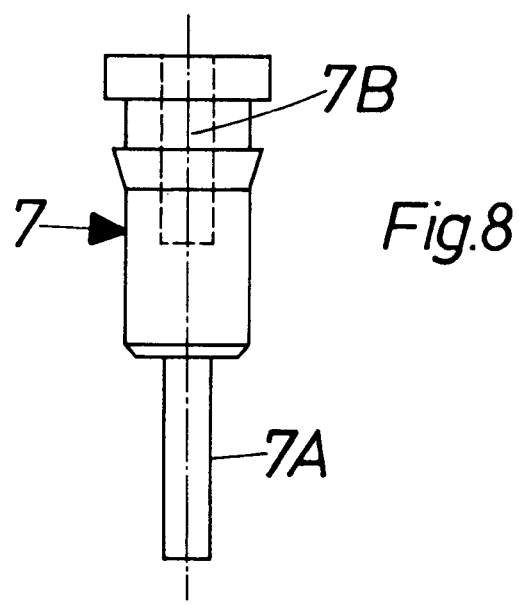
Fig.8

ANTENNA CONNECTOR

BACKGROUND

The present invention relates to an antenna connector for providing connection between an antenna in a wrist-band or the like and electronic means within a wrist-watch or the like.

Development work on personal information management systems is going on. Such a system can include a personal information manager—in the form of a wrist-watch—, a computer, and communication means therebetween. The details of the system are not relevant for the present invention, and no further description thereof is therefore given. It is sufficient to note that the personal information manager needs an antenna for its communication with the computer and that the antenna preferably is arranged in the wrist-band of the personal information manager/wrist-watch.

Several solutions to the problem of establishing appropriate connection between the antenna in the wrist-band and the electronic means in the wrist-watch are known. Relevant examples are disclosed in U.S. Pat. Nos. 4,754,285, 5,179,733, 5,235,560, 5,303,421, EP-A-0 126 629, and EP-A-0 631 341.

All these known solutions suffer from disadvantages, such that the antenna is directly connected to the electronic means in the wrist-watch and is susceptible to bending stresses at the use of the device and/or that the antenna can be exposed to tensile stresses at use, which in both cases ultimately can lead to rupture of the antenna. Also, it may be difficult or at least inconvenient to connect the antenna in the wrist-watch, which among other things means that an exchange of the wrist-band can be difficult to perform.

SUMMARY

These and other problems can be obviated by an antenna connector according to the invention, having a wrist-band contact part for attachment to the wrist-band and connection to the antenna therein and for rotatable arrangement on a wrist-watch pin, and a wrist-watch contact part for rotatable arrangement on the wrist-watch pin in electric contact with the wrist-band contact part and for connection to the electronic means within the wrist-watch.

By this arrangement rotatable on the per se conventional wrist-watch pin, the antenna itself is not exposed to any stresses, but still the appropriate electric connection can be established.

For the necessary electric insulation of the contact parts from the usually metallic wrist-watch pin and the metallic wrist-watch case, the pin may be provided with a plastic sleeve arrangement, which also can have the purpose of providing mechanical stability, as appears below.

The rotatable arrangement of the contact parts may be attained in that they are provided with loops with an inner diameter corresponding to the outer diameter of the sleeve.

Preferably, the wrist-band contact part has two loops and the wrist-watch contact part one loop, arranged between said two loops in electric contact therewith.

For enhancing the electric contact between the loops a wave washer is preferably arranged around the wrist-watch pin between the loop of the wrist-watch contact part and one of the loops of the wrist-band contact part. This wave washer may be made of gold, which is a material with very good resilient and contact properties. The contact creating surfaces of the loops can also be gold-plated.

As mentioned above, the pin sleeve arrangement can—beside the above mentioned inner sleeve for receiving the loops—preferably have two outer sleeves on the inner sleeve for providing lateral support for the loops.

Electric connection to the electronic means in the wrist-watch could be provided directly from the wrist-watch contact part, but a more versatile solution, for example enabling an easy exchange of the wrist-band, is according to the invention provided in that the wrist watch contact part has a contact pin for contact with an antenna contact socket in an insulating contact socket holder in the case of the wrist-watch.

BRIEF DESCRIPTION OF THE DRAWINGS

The invention will be described in further detail below under reference to the accompanying drawings, in which FIGS. 2–8 illustrate parts of this antenna connector, wherein FIG. 3 is a top view of a wrist-watch pin, FIG. 4 is a top view of a wave washer, FIGS. 6A and 6B are a top view and an end view, respectively, of a wrist-watch contact part, FIG. 7 is a section to a greater scale of a contact socket holder, and FIG. 8 is a side view to the same scale as FIG. 7 of an antenna contact socket.

DETAILED DESCRIPTION

Figure 1:
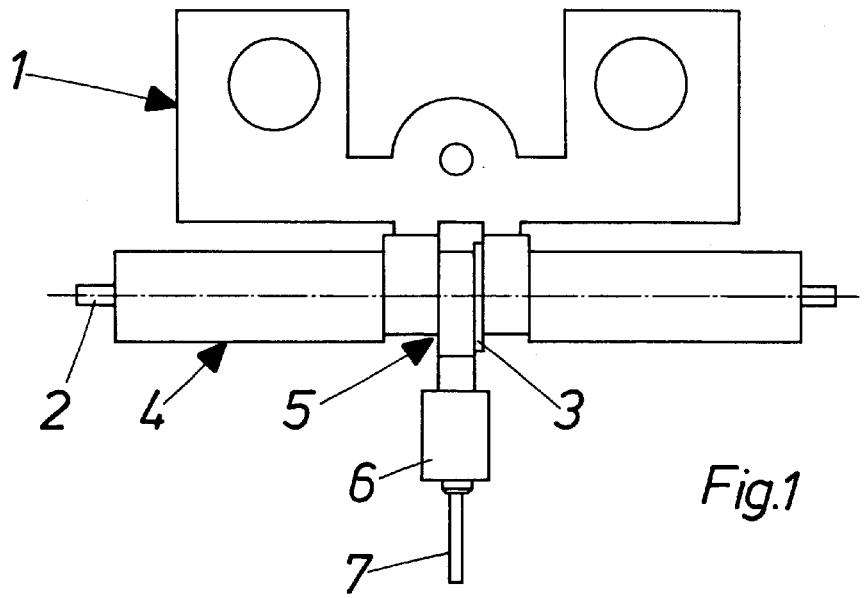
FIG. 1 is a top view of an assembled antenna connector according to the invention.

As shown in FIG. 1, an antenna connector according to the invention consists of the following parts to be further described below under special reference to FIGS. 2–8: a wrist-band contact part 1, a wrist-watch pin 2, a wave washer 3, a pin sleeve arrangement 4, a wrist-watch contact part 5, a contact socket holder 6, and an antenna contact socket 7.

Figure 3:
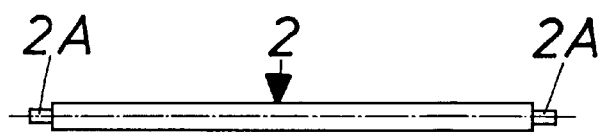
Figure 4:
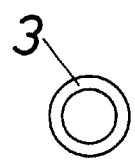
Figure 5A:
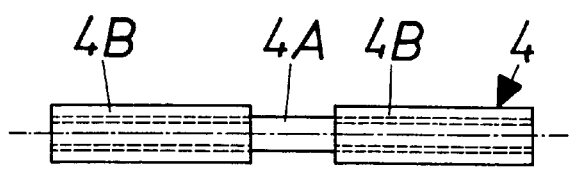
FIGS. 5A and 5B are a top view and an end view, respectively, of a pin sleeve arrangement.
Figure 5B:
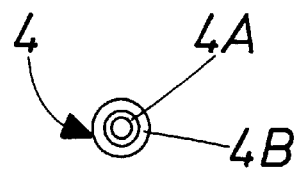

The antenna connector according to the invention is built up around the wrist-watch pin 2, which is shown in FIG. 3 and is the ordinary pin for mounting a wrist-band (not shown) or the like to a wrist-watch (not shown) or the like. The pin 2 may in a conventional way be provided with two end pivots 2A, of which at least one is resilient and which are intended for mounting in suitable holes in two shanks of the wrist-watch in a conventional way.

An inner sleeve 4A of an electrically insulating material is arranged on the metallic pin 2 and preferably extends all the way between said shanks. The insulation is of special importance, when the case of the wrist-watch is made of a metallic material in the usual way. Outer sleeves 4B, described below, are provided for the purpose of giving mechanical stability.

Figure 2A:
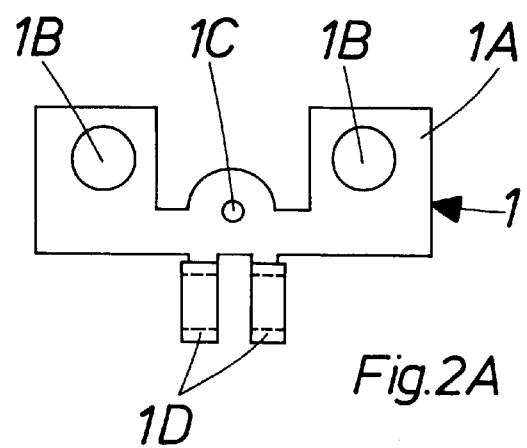
FIGS. 2A and 2B are a top view and an end view, respectively, of a wrist-band contact part.
Figure 2B:
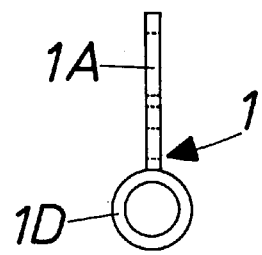

A metallic wrist-band contact part 1 to be arranged on the inner sleeve 4A is shown in FIGS. 2A and 2B. In a preferably flat portion 1A the contact part 1 may be provided with two apertures 1B for attachment to the wrist-band and a central hole 1C for connection, for example by soldering, of an antenna (not shown) arranged in the wrist-band. By the described arrangement the antenna may be connected to the contact part 1 without any risk for being exposed to any tensile stresses, which are taken up through the apertures 1B.

The contact part 1 is also provided with two loops 1D with an inner diameter corresponding to the outer diameter of the inner sleeve 4A. In this way the wrist-band contact part 1 can be rotatably arranged on the pin 2 without any risk for electrical connection therewith.

The metallic wrist-watch contact part 5, shown in FIGS. 6A and 6B, has a loop 5A, which corresponds to the two loops 1D of the wrist-band contact part 1 and is to be arranged therebetween. The part 5 also has a contact pin 5B.

The inner diameter of the loop 5A corresponds to the outer diameter of the inner sleeve 4A. In this way the wrist-watch contact part 5 can be rotatably arranged on the pin 2 independently of the wrist-band contact part 1. The width of the loop 5A of the wrist-watch contact part 5 corresponds to the distance between the loops 1D of the wrist-band contact part 1. Electrical contact between these two contact parts 1 and 5 may be enhanced in that cooperating loop surfaces are gold-plated. A further enhancement of the contact may be attained by the insertion of the wave washer 3 between one of the loops 1D of the wrist-band contact part 1 and the loop 5A of the wrist-watch contact part 5. This wave washer 3 may be gold-plated or even entirely be made of gold for an optimal contact in spite of the relative rotational movements.

In order to mechanically stabilize the construction in the lateral direction two outer sleeves 4B, which have an inner diameter corresponding to the outer diameter of the inner sleeve 4A and are made of an electrically insulating material, are arranged on the inner sleeve abutting the loops 1D of the wrist-band contact part 1. The lengths of these outer sleeves 4A are so chosen that the combined length of the sleeves 4A, the loops 1D and 5A widthwise and the wave washer 3 corresponds to the width between the two shanks of the wrist-watch, so that proper stability is afforded to the loop arrangement.

Alternative arrangements for the loops are possible. For example, each contact part may have only one loop or two or more loops. Also, the wrist-band contact part may have one loop and the wrist-watch contact part two loops. Further, the arrangement of one wave washer at the described location is to be seen as an example of several possibilities.

The contact socket holder 6 is shown in section in FIG. 7. The socket made of an insulating material, preferably a plastic material, is to be permanently attached in the case of the wrist-watch. Its inner shape corresponds to the outer shape of the metallic antenna contact socket 7. The socket 7 is to be inserted from the top side of the holder 6, and there are cooperating flange means to thereafter keep it in place therein. The free pin 7A of the socket 7 is to be soldered in an appropriate hole in a PCB or otherwise permanently connected to electronic means within the wrist-watch, whereas the contact pin 5B of the wrist-watch contact part 5 is to be inserted in a recess 7B in the antenna contact socket 7 for releasable electric contact.

The purpose of the connection via the holder and socket arrangement in the wrist-watch case is to enable exchange of the wrist-band with the antenna without any need for a new soldering operation or the like.

In order to provide an idea about the size of the antenna connector as shown and described it can be mentioned that the length of the wrist-watch pin 2 may be 22 mm and the diameter of the sleeve arrangement 4 may be 4 mm.

What is claimed is:

1. An antenna connector for providing connection between an antenna in a wrist-band and electronic means within a wrist-watch, comprising:
    a wrist-band contact part for attachment to the wrist-band and connection to the antenna therein and for rotatable arrangement on a wrist-watch pin, and
    a wrist-watch contact part for rotatable arrangement on the wrist-watch pin in electric contact with the wrist-band contact part and for connection to the electronic means within the wrist-watch.

2. An antenna connector according to claim 1, further comprising a pin sleeve arrangement for electric insulation of the contact parts from the wrist-watch pin.

3. An antenna connector according to claim 2, wherein the wrist-band contact part and the wrist-watch contact part have loops for rotatable arrangement around the wrist-watch pin.

4. An antenna connector according to claim 3, wherein the wrist-band contact part has two loops and the wrist-watch contact part one loop, arranged between said two loops in electric contact therewith.

5. An antenna connector according to claim 4, wherein a wave washer is arranged around the wrist-watch pin between the loop of the wrist-watch contact part and one of the loops (1D) of the wrist-band contact part.

6. An antenna connector according to claim 5, wherein the wave washer is made of gold and that the contact creating surfaces of the loops are gold-plated.

7. An antenna connector according to claim 4, wherein the pin sleeve arrangement consists of an inner sleeve (4A) for receiving the loops and two outer sleeves on the inner sleeve and surrounding the loops for lateral support for the latter.

8. An antenna connector according to claim 1, wherein the wrist-watch contact part has a contact pin (5B) for contact with an antenna contact socket in an insulating contact socket holder in the case of the wrist-watch.

* * * * *